US009175597B2

(12) United States Patent
Katsumata et al.

(10) Patent No.: US 9,175,597 B2
(45) Date of Patent: Nov. 3, 2015

(54) CONTROL DEVICE FOR SUPERCHARGED ENGINE

(75) Inventors: Machiko Katsumata, Susono (JP);
Ryutaro Moriguchi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/376,532

(22) PCT Filed: Apr. 18, 2011

(86) PCT No.: PCT/JP2011/059541
§ 371 (c)(1),
(2), (4) Date: Dec. 6, 2011

(87) PCT Pub. No.: WO2012/143997
PCT Pub. Date: Oct. 26, 2012

(65) Prior Publication Data
US 2014/0034026 A1   Feb. 6, 2014

(51) Int. Cl.
*F02D 23/00* (2006.01)
*F02B 33/44* (2006.01)
*F02B 33/00* (2006.01)
(Continued)

(52) U.S. Cl.
CPC ............. *F02B 33/00* (2013.01); *F02D 41/0007* (2013.01); *F02D 41/18* (2013.01); *F02B 37/16* (2013.01); *F02B 37/18* (2013.01); *F02D 2041/1433* (2013.01);
(Continued)

(58) Field of Classification Search
CPC ...... F02B 37/18; F02B 33/00; F02D 41/0007; F02D 41/18

USPC .................. 60/600, 602, 605.1; 701/102, 103
See application file for complete search history.

(56) References Cited

U.S. PATENT DOCUMENTS 4,697,421 A  * 10/1987 Otobe et al. .................... 60/602
4,732,003 A  *  3/1988 Ueno et al. ...................... 60/602
(Continued)

FOREIGN PATENT DOCUMENTS

JP         A-11-218031        8/1999
JP         A-2004-27897       1/2004
(Continued)

OTHER PUBLICATIONS

International Search Report mailed May 17, 2011 issued in International Patent Application No. PCT/JP2011/059541 (with translation).

*Primary Examiner* — Thai Ba Trieu
*Assistant Examiner* — Ngoc T Nguyen
(74) *Attorney, Agent, or Firm* — Oliff PLC

(57) ABSTRACT

A control device is provided that acquires an estimated value of a waste gate valve opening, derives a first relation which is established between a throttle downstream pressure and an intake valve flow rate based on the estimated value, and derives a second relation which is established between the throttle downstream pressure and the throttle flow rate from a throttle model based on a measured value of a throttle opening and a measured value of a throttle upstream pressure. Subsequently, the control device calculates an estimated value of the intake valve flow rate based on the first relation and the second relation, and regulates a correspondence relation of the estimated value of the waste gate valve opening and the manipulated variable of the waste gate valve based on a comparison result of the estimated value of the intake valve flow rate and a measured value of an intake flow rate.

4 Claims, 9 Drawing Sheets

(51) Int. Cl.
*F02D 41/00* (2006.01)
*F02D 41/18* (2006.01)
*F02B 37/16* (2006.01)
*F02B 37/18* (2006.01)
*F02D 41/14* (2006.01)

(52) U.S. Cl.
CPC .............. *F02D 2200/0402* (2013.01); *F02D 2200/0404* (2013.01); *Y02T 10/144* (2013.01)

(56) References Cited

U.S. PATENT DOCUMENTS

| | | | | |
|---|---|---|---|---|
| 5,551,235 | A * | 9/1996 | Entenmann et al. | 60/602 |
| 6,055,811 | A * | 5/2000 | Maddock et al. | 60/602 |
| 6,076,352 | A * | 6/2000 | Hayashi | 60/602 |
| 6,378,306 | B2 * | 4/2002 | Koelle et al. | 60/605.1 |
| 7,540,148 | B2 * | 6/2009 | Wild et al. | 60/602 |
| 7,607,416 | B2 * | 10/2009 | Sato | 123/406.24 |
| 7,775,043 | B2 * | 8/2010 | Funke et al. | 60/602 |
| 2008/0077304 | A1 * | 3/2008 | Suzuki et al. | 701/102 |
| 2010/0154523 | A1 * | 6/2010 | Nakano et al. | 73/114.33 |
| 2011/0088388 | A1 * | 4/2011 | Panciroli et al. | 60/602 |
| 2011/0088389 | A1 * | 4/2011 | Panciroli et al. | 60/602 |
| 2014/0326213 | A1 * | 11/2014 | Katsumata et al. | 123/399 |

FOREIGN PATENT DOCUMENTS

| | | |
|---|---|---|
| JP | A-2004-156525 | 6/2004 |
| JP | A-2006-274831 | 10/2006 |
| JP | A-2006-274834 | 10/2006 |
| JP | A-2008-95587 | 4/2008 |
| JP | B2-4254203 | 4/2009 |
| JP | A-2009-168007 | 7/2009 |
| JP | A-2010-174710 | 8/2010 |
| JP | A-2010-180781 | 8/2010 |
| JP | A-2010-216305 | 9/2010 |
| JP | A-2011-27058 | 2/2011 |

* cited by examiner

CONTROL DEVICE FOR SUPERCHARGED ENGINE

TECHNICAL FIELD

The present invention relates to a control device for a supercharged engine having a waste gate valve.

BACKGROUND ART

One of the control techniques of supercharged engines which attracts attention at present is active control of a waste gate valve using an electric actuator such as an E-VRV (Electronic Vacuum Regulating Valve). In the active control, a waste gate valve is moved to an optional opening according to a manipulation signal from an ECU, and thereby, a turbo rotational speed is actively controlled. According to this, a supercharging pressure can be optionally regulated, and further improvement in fuel economy performance and exhaust gas performance is achieved.

However, in order to achieve such active control, it is necessary to understand how much the waste gate valve is actually opened. This is because even when the waste gate valve is actively operated, if the opening thereof deviates from an originally-planned opening, the engine experiences troubled operation. For example, if the waste gate valve is closed more than planned in a heavy load state, pre-ignition occurs due to excessive supercharging. Conversely, if the waste gate valve is opened more than planned, desired acceleration performance cannot be obtained due to an insufficient supercharging pressure. Further, information about a waste gate valve opening is important for accurately estimating air quantity in a cylinder.

However, it is not easy in realty to measure a waste gate valve opening with high precision by measuring means such as a sensor. Accordingly, if information about a waste gate valve opening is necessary, the waste gate valve opening must be estimated from a manipulated variable at a time of an ECU manipulating the waste gate valve. More specifically, the waste gate valve opening is estimated from the manipulated variable of the waste gate valve by using a correspondence relation that is defined in advance. However, a deviation is likely to occur between an actual correspondence relation and the defined correspondence relation due to an individual difference and aged deterioration of the waste gate valve. In such a case, the estimated value of the waste gate valve opening differs from the actual value, and engine control is adversely affected when engine control is performed with reference to the estimated value of the waste gate valve opening. Because of this, when active control of a waste gate valve is carried out, the technique capable of obtaining an accurate estimated value of the waste gate valve opening is also required.

As prior art relating to the present invention, the following prior art described in respective Patent Documents is cited. For example, Japanese Patent Laid-Open No. 2004-156525 indicates that the valve lift amount which is the cause of an error is corrected based on an error between an actual intake valve flow rate and an estimated intake valve flow rate which is calculated by using a model. However, Japanese Patent Laid-Open No. 2004-156525 does not mention a waste gate valve, to say nothing of describing the method for obtaining an accurate estimated value of a waste gate valve opening.

CITATION LIST

Patent Literatures

Patent Literature 1: Japanese Patent Laid-Open No. 2004-156525
Patent Literature 2: Japanese Patent Laid-Open No. 11-218031
Patent Literature 3: Japanese Patent Laid-Open No. 2006-274834
Patent Literature 4: Japanese Patent Laid-Open No. 2006-274831

SUMMARY OF INVENTION

As described above, enabling accurate estimation of a waste gate valve opening is important in carrying out active control of a waste gate valve. As a solution to this problem, the present invention uses a physical model in which behavior of the air in a supercharged engine is modeled. Such a physical model is used for calculation for estimating an air amount in a cylinder in the control device of a supercharged engine. The physical quantities which are calculated according to the physical model of the supercharged engine include a physical quantity the value of which is determined by the waste gate valve opening and which can be measured by a sensor which is loaded on the supercharged engine. By comparing the measured value of such a physical quantity, and the estimated value of the physical quantity which is calculated by using the physical model based on the estimated value of the waste gate valve opening, a deviation between the estimated value and the actual value of the waste gate valve opening can be indirectly determined. Subsequently, by regulating the correspondence relation of the estimated value of the waste gate valve opening, and the manipulated variable of the waste gate valve to eliminate a difference between the measured value and the estimated value of the aforesaid physical quantity, the estimated value of the waste gate valve opening can be corrected to correspond to the actual value.

More specifically, a control device for a supercharged engine which the present invention provides includes a throttle model and an intake valve model as physical models (please see Description of Models for additional details). The throttle model will model a relation established among a throttle upstream pressure, a throttle downstream pressure, a throttle opening and a throttle flow rate. The throttle upstream pressure means a pressure in a space from a compressor to a throttle, and the throttle downstream pressure means a pressure of a space from the throttle to the intake valve. It is known that a flow rate of the air which passes through the throttle is mainly determined by a pressure difference between them and a flow passage area. The flow passage area is determined by a throttle opening. Meanwhile, the intake valve model will model a relation established among the throttle downstream pressure, a waste gate valve opening and an intake valve flow rate. It is known that a relation that can be approximated by a straight line exists between the throttle downstream pressure and the flow rate of the air which passes through the intake valve. It is also known that the waste gate valve opening relates to a value of a coefficient which determines a gradient and an intercept of an equation of the straight line. These physical models can be all expressed by mathematical expressions, and all of them are stored in a storage section of the present control device in the format of processing programs.

Further, the present control device includes a function of estimating the waste gate valve opening from the manipulated variable of the waste gate valve. For the estimation, a correspondence relation is used between the manipulated variable of the waste gate valve and the waste gate valve opening, which is defined in advance. The correspondence relation is stored in a storage section of the present control device as the map data. Further, the present control device includes the function of acquiring the respective measured values of the throttle opening, the throttle upstream pressure and the intake flow rate. The intake flow rate means the flow rate of the air which is taken into an intake passage of a supercharged engine. These physical quantities can be measured by sensors loaded on the supercharged engine. Subsequently, based on these measured values and the estimated value of the waste gate valve opening, the present control device carries out the following calculation by using the aforementioned respective physical models.

According to a first mode of the present invention, the present control device derives a relation (hereinafter, a first relation) which is established between the throttle downstream pressure and the intake valve flow rate from the intake valve model, based on the estimated value of the waste gate valve opening. Further, the present control device derives a relation (hereinafter, a second relation) which is established between the throttle downstream pressure and the throttle flow rate from the throttle model, based on the measured value of the throttle opening and the measured value of the throttle upstream pressure. Next, the present control device calculates an estimated value of the intake valve flow rate in a case in which the intake valve flow rate and the throttle flow rate correspond to each other based on the first relation and second relation. The first relation and the second relation can be both expressed by equations. Therefore, by solving the equations, the intake valve flow rate which is estimated from the estimated value of the present waste gate valve opening and the measured value of the throttle upstream pressure can be obtained.

Subsequently, the present control device compares the estimated value of the intake valve flow rate which is obtained as described above and the measured value of the intake flow rate. In a steady state, the intake valve flow rate and the intake flow rate correspond to each other. Therefore, comparing the estimated value of the intake valve flow rate and the measured value of the intake flow rate is equivalent to comparing the estimated value and the measured value, that is, the actual value, of the intake valve flow rate. When an error occurs between the estimated value of the intake valve flow rate and the actual value, the error means that a deviation exists between the estimated value of the waste gate valve opening and the actual value. This is because according to the intake valve model, the estimated value of the intake valve flow rate is influenced by the estimated value of the waste gate valve opening. Thus, according to the first mode of the present invention, the present control device regulates the correspondence relation of the estimated value of the waste gate valve opening and the manipulated variable of the waste gate valve based on comparing the estimated value of the intake valve flow rate and the measured value of the intake flow rate, more specifically, so that the estimated value of the intake flow rate corresponds to the measured value of the intake flow rate. If the estimated value of the intake valve flow rate and the measured value of the intake flow rate correspond to each other, a deviation of the estimated value of the waste gate valve opening with respect to the actual value is eliminated.

Further, according to a second mode of the present invention, the present control device calculates the estimated value of the throttle downstream pressure by using the intake valve model, based on the estimated value of the waste gate valve opening, and the measured value of the intake flow rate. In a steady state, the intake valve flow rate and the intake flow rate correspond to each other. Therefore, the measured value of the intake flow rate can be considered to be the actual value of the intake valve flow rate in the intake valve model. Next, the present control device calculates an estimated value of the throttle upstream pressure by using the throttle model, based on the estimated value of the throttle downstream pressure which is calculated by using the intake valve model, the measured value of the throttle opening, and the measured value of the intake flow rate. In a steady state, the intake valve flow rate and the throttle flow rate correspond to each other. Therefore, the measured value of the intake flow rate can be considered to be the actual value of the throttle flow rate in the throttle model.

Subsequently, the present control device compares the estimated value of the throttle upstream pressure which is obtained as described above with the measured value thereof. When an error occurs between the estimated value and the measured value of the throttle upstream pressure, the error means that a deviation exists between the indicated value and the actual value of the waste gate valve opening. This is because according to the throttle model and the intake valve model, the estimated value of the throttle downstream pressure is determined in accordance with the estimated value of the waste gate valve opening, and the estimated value of the throttle upstream pressure is determined by the estimated value of the throttle downstream pressure. Thus, according to the second mode of the present invention, the present control device regulates the correspondence relation of the estimated value of the waste gate valve opening and the manipulated variable of the waste gate valve, based on comparing the estimated value and the measured value of the throttle upstream pressure, more specifically, so that the estimated value and the measured value of the throttle upstream pressure correspond to each other. If the estimated value and the measured value of the throttle upstream pressure correspond to each other, a deviation of the estimated value of the waste gate valve opening with respect to the actual value is eliminated.

With the above two modes as the precondition, the present invention also can adopt a third mode which will be described next. In the third mode of the present invention, another feature is added to the feature of the first mode or the second mode. The added feature includes the supercharged engine being an engine including a variable valve mechanism which makes a valve lift amount of an intake valve variable, and a parameter of the intake valve model including the valve lift amount. According to the third mode of the present invention, an estimated value of the valve lift amount is used in addition to the estimated value of the waste gate valve opening, for determination of the coefficient of an equation of a straight line expressing a relation of the throttle downstream pressure and the intake valve flow rate. It is known that in the case of the engine with a variable valve lift amount, the relation between the throttle downstream pressure and the intake valve flow rate changes according to the valve lift amount.

The valve lift amount is added to the parameter of the intake valve model, and thereby, the relation of the throttle downstream pressure and the intake valve flow rate is more accurately expressed. However, meanwhile, if a deviation exists between the estimated value and the actual value of the valve lift amount, the targeted air quantity in a cylinder cannot be achieved. Further, the deviation of the estimated value and the actual value of the valve lift amount also influences regulation of the correspondence relation of the estimated value of the waste gate valve opening and the manipulated variable of the waste gate valve, which is performed in the aforementioned first mode and second mode. This is because the calculation result by the model is influenced by the estimated value of the valve lift amount. The third mode of the present invention focuses on elimination of the deviation of the estimated value and the actual value of the valve lift amount, in addition to elimination of the deviation of the estimated value and the actual value of the waste gate valve opening.

According to the third mode of the present invention, the present control device includes a turbo rotational speed model and a compressor model as additional physical models. The turbo rotational speed model will model a relation which is established among the intake valve flow rate, the waste gate valve opening, and a turbo rotational speed. The intake valve flow rate in a steady state is equivalent to the flow rate of the gas which flows into the turbine. Therefore, if the intake valve flow rate and the waste gate valve opening are determined, the turbo rotational speed can be uniquely identified from the operating characteristic of the supercharger. Meanwhile, the compressor model will model a relation which is established among the turbo rotational speed, the throttle upstream pressure and a compressor flow rate. It is known that the flow rate of the air which is fed out by the compressor is mainly determined by the pressure difference in front of and behind the compressor and the rotational speed of the compressor. The pressure upstream of the compressor is substantially equal to atmospheric pressure, and the rotational speed of the compressor is equal to the turbo rotational speed. According to the third mode of the present invention, the present control device carries out the following calculation by using these physical models.

The present control device first estimates the valve lift amount from the manipulated variable of the variable valve mechanism. For the estimation, a correspondence relation is used between the manipulated variable of the variable valve mechanism and the valve lift amount, which is defined in advance. Further, the present control device calculates an estimated value of the turbo rotational speed by using the turbo rotational speed model, based on the estimated value of the waste gate valve opening, and the measured value of the intake flow rate. In a steady state, the intake valve flow rate and the intake flow rate correspond to each other. Therefore, the measured value of the intake flow rate can be considered to be the actual value of the intake valve flow rate in the turbo rotational speed model. Next, the present control device calculates an estimated value of the compressor flow rate by using the compressor model, based on the estimated value of the turbo rotational speed which is calculated by using the turbo rotational speed model, and the measured value of the throttle upstream pressure.

Subsequently, the present control device compares the estimated value of the compressor flow rate which is obtained as described above with the measured value of the intake flow rate. In a steady state, the compressor flow rate and the intake flow rate correspond to each other. Therefore, comparing the estimated value of the compressor flow rate and the measured value of the intake flow rate is equivalent to comparing the estimated value and the measured value, that is, the actual value of the compressor flow rate. When an error occurs between the estimated value and the actual value of the compressor flow rate, the error means that a deviation exists between the estimated value and the actual value of the waste gate valve opening. This is because according to the turbo rotational speed model and the compressor model, the estimated value of the turbo rotational speed is determined in accordance with the estimated value of the waste gate valve opening, and the estimated value of the compressor flow rate is determined by the estimated value of the turbo rotational speed. Thus, the present control device compares the estimated value of the compressor flow rate and the measured value of the intake flow rate, and regulates the correspondence relation of the estimated value of the waste gate valve opening and the manipulated variable of the waste gate valve based on a comparison result thereof. Since the valve lift amount is not used for calculation by the turbo rotational speed model and the compressor model, the deviation of the estimated value and the actual value of the valve lift amount does not influence the regulation result of the correspondence relation according to the present method.

Next, the present control device compares the regulation result of the correspondence relation of the estimated value of the waste gate valve opening and the manipulated variable of the waste gate valve according to the aforementioned method, with the regulation result according to the first mode or the second mode of the present invention. When a deviation occurs between both of them, the deviation means that a deviation exists between the estimated value and the actual value of the valve lift amount. In this case, the present control device acquires the estimated value of the waste gate valve opening in accordance with the correspondence relation which is regulated according to the aforementioned method, and calculates the estimated value of the intake valve flow rate by using the intake valve model based on the estimated value of the waste gate valve opening and the estimated value of the valve lift amount. Subsequently, the present control device compares the estimated value of the intake valve flow rate and the measured value of the intake flow rate, and based on the comparison result, regulates the correspondence relation of the estimated value of the valve lift amount and the manipulated variable of the variable valve mechanism. If the estimated value of the intake valve flow rate and the measured value of the intake flow rate correspond to each other by regulation of the correspondence relation, the deviation of the estimated value of the valve lift amount with respect to the actual value is eliminated.

DESCRIPTION OF EMBODIMENTS

Embodiment 1

Embodiment 1 of the present invention will be described with reference to the drawings.

Figure 1:
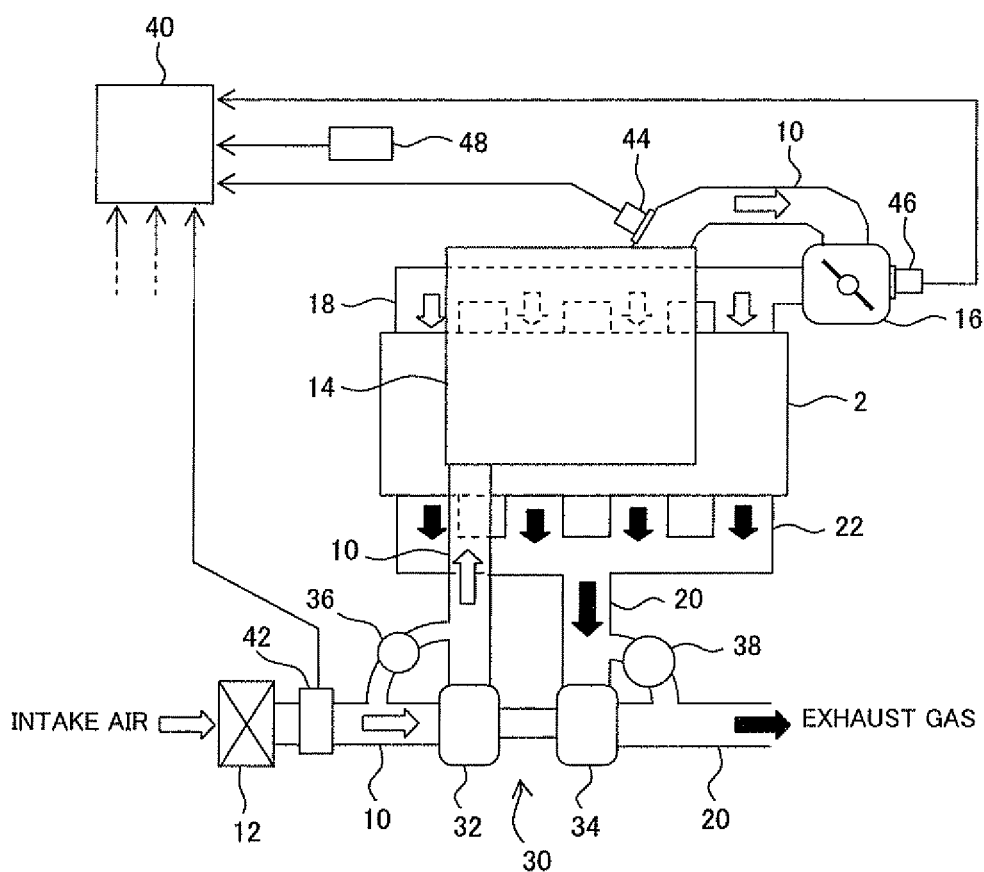
FIG. 1 is a schematic diagram showing a configuration of a supercharged engine to which a control device of each of embodiments of the present invention is applied.

An engine to which a control device of the present embodiment is applied is a supercharged engine having a waste gate valve, and in more detail, a four-cycle reciprocal engine which can control torque by regulation of an air quantity by a throttle. FIG. 1 is a schematic diagram showing a configuration of a supercharged engine to which the control device of the present embodiment is applied. The supercharged engine according to the present embodiment includes a turbo supercharger 30 which is constituted of a compressor 32 which is provided in an intake passage 10 and a turbine 34 which is provided in an exhaust passage 20. The intake passage 10 is connected to an intake manifold 18 which is mounted on an engine main body 2. An air cleaner 12 is provided at an inlet of the intake passage 10, and an air flow meter 42 for measuring an intake flow rate is disposed downstream of the air cleaner 12 and upstream of the compressor 32. An intercooler 14 is provided between the compressor 32 and a throttle 16 in the intake passage 10. A supercharging pressure sensor 44 for measuring a pressure at an upstream portion of the throttle 16, that is, a supercharging pressure is mounted to an outlet of the intercooler 14. Further, an air bypass valve 36 which recirculates air by bypassing the compressor 32 from a downstream side to an upstream side of the compressor 32 is provided in the intake passage 10. The exhaust passage 20 is connected to an exhaust manifold 22 which is mounted on the engine main body 2. A waste gate valve 38 for passing exhaust gas by bypassing the turbine 34 is provided in the exhaust passage 20. The waste gate valve 38 is a waste gate valve compatible with active control, which is driven by the E-VRV.

The control device of the present embodiment is realized as part of the function of an ECU (Electronic Control Unit) 40 which controls the supercharged engine. To the ECU 40, various kinds of information and signals relating to the operation state and the operation condition of the engine are inputted from various sensors such as a throttle opening sensor 46 and an atmospheric pressure sensor 48 in addition to the air flow meter 42 and the supercharging pressure sensor 44. The ECU 40 manipulates various actuators such as the throttle 16 and the waste gate valve 38 based on the information and signals. In regard with the waste gate valve 38, a manipulated variable signal is supplied to the E-VRV from the ECU 40. The E-VRV is operated in accordance with the signal, whereby the waste gate valve 38 is moved to an optional opening. The ECU 40 stores a map showing a correspondence relation of a duty ratio which is the manipulated variable of the waste gate valve 38 and an estimated value of the waste gate valve opening.

The ECU 40 as the control device has the function of estimating the air quantity in a cylinder. For estimation of the air quantity in the cylinder by the ECU 40, an air quantity estimation model which is programmed is used. The air quantity estimation model is the one in which a behavior of air in the supercharged engine is physically modeled, and the outline thereof is expressed by a functional block diagram of FIG. 2.

Figure 2:
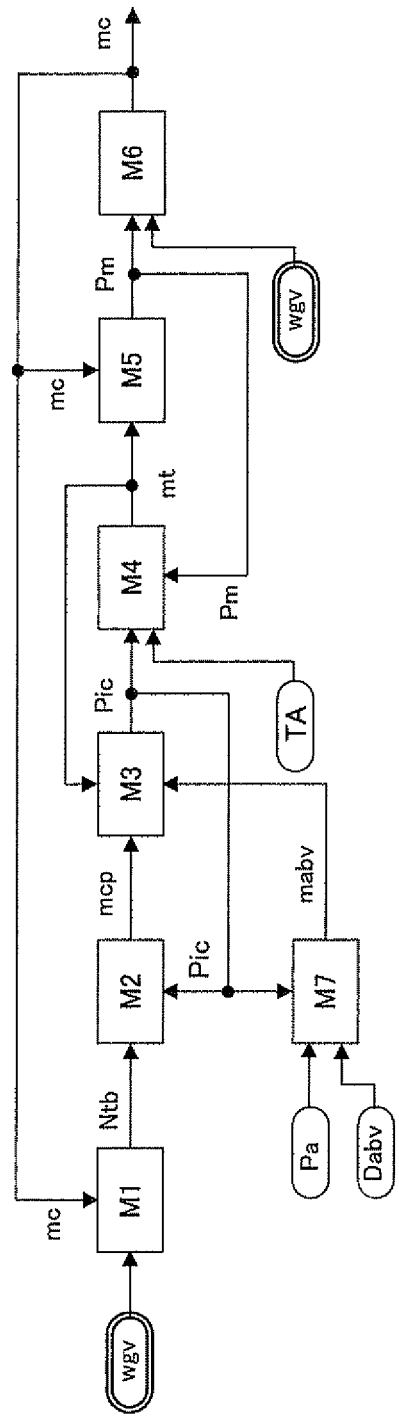
FIG. 2 is a block diagram showing an air quantity estimation model which is used in the control device of each of the embodiments of the present invention.

As shown in FIG. 2, the air quantity estimation model which is used in the present embodiment includes a turbo rotational speed model M1, a compressor model M2, an intercooler model M3, a throttle model M4, an intake manifold model M5, an intake valve model M6, and an ABV (Air Bypass Valve) model M7. Hereinafter, a content of each of the sub-models included in the air quantity estimation model will be described. However, examples of the mathematical expressions which can be used for these sub-models are known, and the examples of the mathematical expressions themselves are not the features of the present invention. Therefore, the description of the specific mathematical expressions for the respective sub-models will be omitted.

The turbo rotational speed model M1 is a model of a rotation behavior of the turbo supercharger 30, in which the relation which is established among an intake valve flow rate, a waste gate valve opening and a turbo rotational speed is modeled. The turbo rotational speed model M1 is configured by a mathematical expression or a map which is based on experimental data. In the turbo rotational speed model M1, a waste gate valve opening (wgv) which is estimated from the manipulated variable of the waste gate valve 38, and an intake valve flow rate (mc) which is calculated in the intake valve model M6 which will be described later are inputted, and a turbo rotational speed (Ntb) is calculated from the input information of them.

The compressor model M2 is a model of the compressor 32 of the turbo supercharger 30, in which a relation which is established among the turbo rotational speed, supercharging pressure and a compressor flow rate is modeled. The compressor model M2 is configured by a mathematical expression or a map which is based on experimental data. In the compressor model M2, the information of the turbo rotational speed (Ntb) which is calculated in the turbo rotational speed model M1, supercharging pressure (Pic) which is calculated in the intercooler model M3 which will be described later and the like is inputted, and from the input information of them, a compressor flow rate (mcp) is calculated.

ABV model M7 is a model for calculating a flow rate of air which is returned from the downstream side to the upstream side of the compressor 32 by the air bypass valve 36. A flow rate of the air bypass valve 36 can be calculated from a pressure difference in front of and behind the air bypass valve 36, and a duty ratio which operates the air bypass valve 36. Accordingly, in the ABV model M7, an atmospheric pressure (Pa) which is measured by the atmospheric pressure sensor 48, the supercharging pressure (Pic) which is calculated in the intercooler model M3 which will be described later, and a duty ratio (Dabv) which is outputted from the ECU 40 to the air bypass valve 36 are inputted, and an air bypass valve flow rate (mabv) is calculated from the input information of them.

The intercooler model M3 is a physical model which is constructed based on a conservation rule concerning the air in the intercooler 14 in the intake passage 10. As the intercooler model M3, specifically, the energy conservation rule formula and the flow rate conservation rule formula are used. In the intercooler model M3, information of the compressor flow rate (mcp) which is calculated in the compressor model M2, a throttle flow rate (mt) which is calculated in the throttle model M4 which will be described later, the ABV flow rate (mabv) which is calculated in the ABV model M7 and the like is inputted, and the supercharging pressure (Pic) is calculated from the input information of them.

The throttle model M4 is a model for calculating the flow rate of the air which passes through the throttle 16, and more specifically, a flow rate formula of an orifice which is based on a pressure difference in front of and behind the throttle 16, a flow passage area which is determined by the throttle opening, and a flow rate coefficient is used. In the throttle model M4, information of a throttle opening (TA) which is measured in the throttle opening sensor 46, the supercharging pressure (Pic) as the throttle upstream pressure which is calculated in the intercooler model M3, intake manifold pressure (Pm) as a throttle downstream pressure which is calculated in the intake manifold model M5 which will be described later and the like is inputted, and the throttle flow rate (mt) is calculated from the input information of them.

The intake manifold model M5 is a physical model which is constructed based on the conservation rule concerning the air in the intake manifold 18. As the intake manifold model M5, specifically, the energy conservation rule formula and the flow rate conservation rule formula are used. In the intake manifold model M5, information of the throttle flow rate (mt) which is calculated in the throttle model M4, an intake valve flow rate (mc) which is calculated in the intake valve model M6 which will be described later and the like is inputted, and the intake manifold pressure (Pm) is calculated from the input information of them.

The intake valve model M6 is a model on the basis of an experiment in which the relation of the intake valve flow rate and the intake manifold pressure is investigated. By the empirical rule which is obtained by the experiment, the relation of the intake air quantity and the intake manifold pressure is approximated by a straight line in the intake valve model M6. However, the coefficient of the equation of the straight line is not a constant, but is a variable which is determined by the opening of the waste gate valve 38. This is because the opening of the waste gate valve 38 influences a back pressure, and if the back pressure changes, easiness of entry of the air into the cylinder also changes. In the intake valve model M6, information of the intake manifold pressure (Pm) which is calculated in the intake manifold model M5, the waste gate valve opening (wgv) which is estimated from the manipulated variable of the waste gate valve 38 and the like is inputted, and the intake valve flow rate (mc) is calculated from the input information of them.

The ECU 40 calculates the intake valve flow rate by using the air quantity estimation model which is configured as above, and calculates the air quantity in the cylinder based on the intake valve flow rate. In the process of the calculation, the estimated value of the waste gate valve opening is used with the measured values of the throttle opening and the supercharging pressure. The measured values which are obtained by sensors can be considered as equal to the actual values as long as the sensors are calibrated correctly. However, the estimated value of the waste gate valve opening cannot be said to be always equal to the actual value. This is because due to the individual difference and aged deterioration of the waste gate valve 38, the correspondence relation of the waste gate valve opening and the manipulated variable which is defined in the map sometimes differs from the actual one. In regard with this point, the ECU 40 is provided with the function of correcting the estimated value of the waste gate valve opening in accordance with the actual value, as will be described as follows.

First, a method for determination of a deviation between the estimated value and the actual value of the waste gate valve opening, which is adopted in the present embodiment, will be described with use of FIG. 3. Here, the case in which the estimated value of the waste gate valve opening is estimated to be smaller than the actual value will be described as an example.

Figure 3:
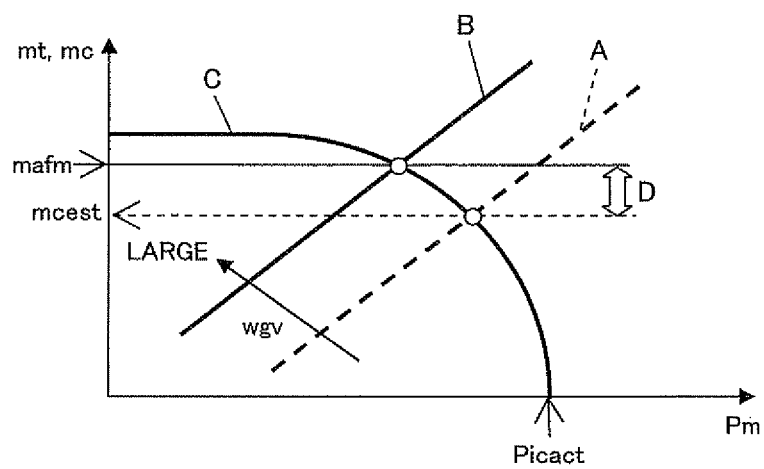
FIG. 3 is a diagram for explaining a method of determination of a deviation between an estimated value and an actual value of a waste gate valve opening, which is adopted in embodiment 1 of the present invention.

The axis of abscissa of the graph shown in FIG. 3 represents the intake manifold pressure (Pm), and the axis of ordinates represents the throttle flow rate (mt) and the intake valve flow rate (mc). In the graph, two straight lines A and B and one curve C are drawn. The straight line A is a straight line which shows a relation between the intake manifold pressure (Pm) and the intake valve flow rate (mc) which are derived from the intake valve model M6 based on the estimated value of the waste gate valve opening. Meanwhile, the straight line B is a straight line showing a relation between the intake manifold pressure (Pm) and the intake valve flow rate (mc) which should be obtained if the actual value of the waste gate valve opening is inputted in the intake valve model M6. However, since the actual value of the waste gate valve opening cannot be directly measured, the straight line B shown in the graph is only virtual, and only the straight line A can be actually derived. The curve C shows a relation of the intake manifold pressure (Pm) and the throttle flow rate (mt) which can be obtained by inputting the respective measured values of the throttle opening and the supercharging pressure in the throttle model M4. As is known from the curve C, when the throttle opening and the supercharging pressure are constant, the throttle flow rate (mt) decreases with increase in the intake manifold pressure (Pm), and when the value of the intake manifold pressure (Pm) corresponds to the supercharging pressure (Picact), the throttle flow rate (mt) becomes zero.

Since the throttle flow rate and the intake flow rate correspond to each other in a steady state, the ratio of the intake manifold pressure and the supercharging pressure at the present point of time can be estimated by substituting the intake flow rate (mafm) which is measured by the air flow meter 42 into the equation of the curve C. Further, since the throttle flow rate (mt) and the intake valve flow rate (mc) correspond to each other in a steady state, if the supercharging pressure is known, the intake valve flow rate (mcest) can be obtained under the estimated value of the waste gate valve opening by calculating the flow rate in the intersection of the curve C and the straight line A. More specifically, the curve C and the straight line A are respectively expressed by the equations, and therefore, by solving the simultaneous equations, the estimated intake valve flow rate (mcest) can be calculated under the estimated value of the waste gate valve opening.

In the present embodiment, the estimated value (mcest) of the intake valve flow rate which is obtained like this, and the intake flow rate (mafm) which is measured by the air flow meter 42 are compared. In a steady state, the intake valve flow rate and the intake flow rate correspond to each other, and therefore, comparing the estimated value (mcest) of the intake valve flow rate and the measured value (mafm) of the intake flow rate is equivalent to comparing the estimated value (mcest) of the intake valve flow rate and the actual value thereof. If the estimated value of the waste gate valve opening corresponds to the actual value, the estimated value (mcest) of the intake valve flow rate also corresponds to the actual value of it. However, if the estimated value of the waste gate valve opening deviates from the actual value, the estimated value (mcest) of the intake valve flow rate does not correspond to the actual value of it. From this, when an error (shown by D in the graph) is present between the estimated value (mcest) of the intake valve flow rate and the measured value (mafm) of the intake flow rate, it can be determined that a deviation occurs between the estimated value and the actual value of the waste gate valve opening, with the presence of the error.

Next, a method for correction of the estimated value of the waste gate valve opening, which is adopted in the present embodiment, will be described. The estimated value of the waste gate valve opening is associated with the manipulated variable of the waste gate valve 38 in the map. In the present embodiment, regulation of the correspondence relation of the waste gate valve opening and the manipulated variable is performed by correcting the data of the map. In the regulation, if the estimated value (mcest) of the intake valve flow rate is smaller than the measured value (mafm) of the intake flow rate, the waste gate valve opening is corrected to a plus side with respect to the manipulated variable so that the intake valve flow rate which is calculated in the intake valve model M6 increases. Conversely, if the estimated value (mcest) of the intake valve flow rate is larger than the measured value (mafm) of the intake flow rate, the waste gate valve opening is corrected to a minus side with respect to the manipulated variable so that the intake valve flow rate which is calculated in the intake valve model M6 decreases.

Figure 4:
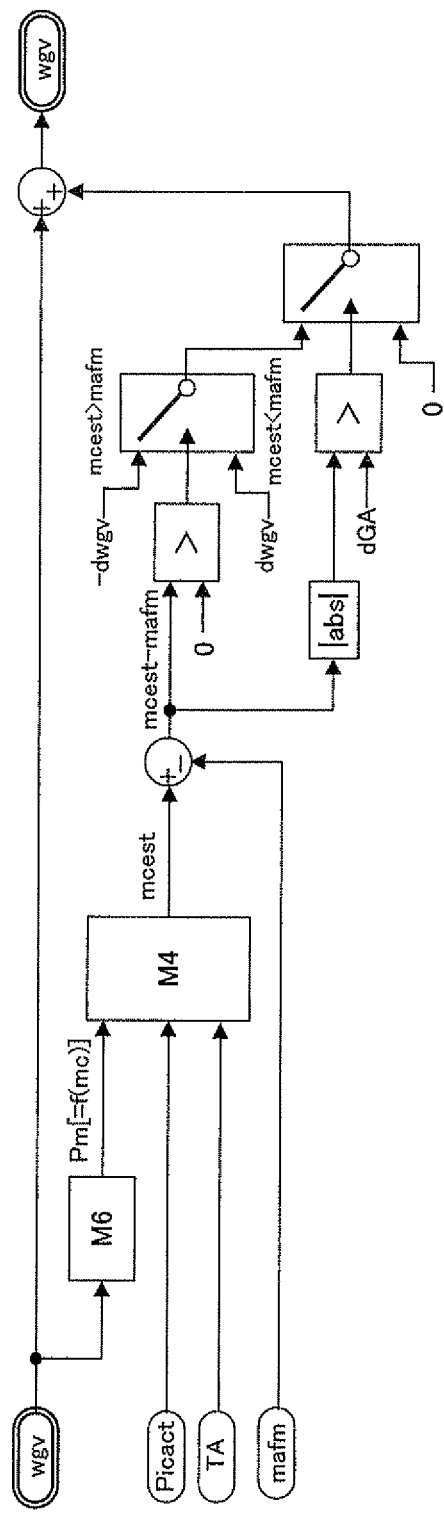
FIG. 4 is a block diagram showing a function for correcting the estimated value of the waste gate valve opening which the control device of embodiment 1 of the present invention has.

FIG. 4 shows a configuration for realizing such a correction method by the ECU 40. As shown in the block diagram, the ECU 40 uses the intake valve model M6 and the throttle model M4. Further, in the ECU 40, the waste gate valve opening (wgv) which is estimated from the manipulated variable is taken, and the supercharging pressure (Picact) which is measured by the supercharging pressure sensor 44, the throttle opening (TA) which is measured by the supercharging pressure sensor 44, and the intake flow rate (mafm) which is measured by the air flow meter 42 are also taken.

The waste gate valve opening (wgv) which is taken in is inputted in the intake valve model M6. In the intake valve model M6, the equation expressing the relation of the intake manifold pressure (Pm) and the intake valve flow rate (mc) is derived, based on the waste gate valve opening (wgv). In the throttle model M4, the estimated value (mcest) of the intake valve flow rate is calculated by solving the simultaneous equations of the equation specified by the supercharging pressure (Picact) and the throttle opening (TA) and the equation obtained in the intake valve model M6.

Next, the ECU 40 calculates a difference of the estimated value (mcest) of the intake valve flow rate and the intake flow rate (mafm). Subsequently, it is determined whether the difference value (mcest−mafm) is larger than zero. When the difference value is larger than zero, that is, when the estimated value (mcest) of the intake valve flow rate is larger than the intake flow rate (mafm), a predetermined value (−dwgv) which is smaller than zero is set as the correction amount of the waste gate valve opening (wgv). Meanwhile, when the difference value is smaller than zero, that is, when the estimated value (mcest) of the intake vale flow rate is smaller than the intake flow rate (mafm), a predetermined value (dwgv) which is larger than zero is set as the correction amount of the waste gate valve opening (wgv). These correction amounts are added to the waste gate valve opening (wgv) when the absolute value of the difference value is larger than a predetermined value (dGA). When the absolute value of the difference value is the predetermined value (dGA) or less, the correction amount is set as zero irrespective of presence or absence of the difference.

Embodiment 2

Next, embodiment 2 of the present invention will be described with reference to the drawings.

A control device of the present embodiment is applied to a supercharged engine which is configured as in FIG. 1, and is realized as part of the function of the ECU 40 which controls the supercharged engine, as in embodiment 1. Further, the ECU 40 as the control device has a function of estimating an air quantity in a cylinder by using the air quantity estimation model shown in FIG. 2 as in embodiment 1.

The difference between the control device of the present embodiment and the control device of embodiment 1 lies in the content of the function of correcting the estimated value of the waste gate valve opening in accordance with an actual value. First, a method for determination of a deviation between the estimated value and the actual value of the waste gate valve opening, which is adopted in the present embodiment, will be described with use of FIG. 5. Here, it is assumed that the estimated value of the waste gate valve opening is estimated to be smaller than the actual value.

Figure 5:
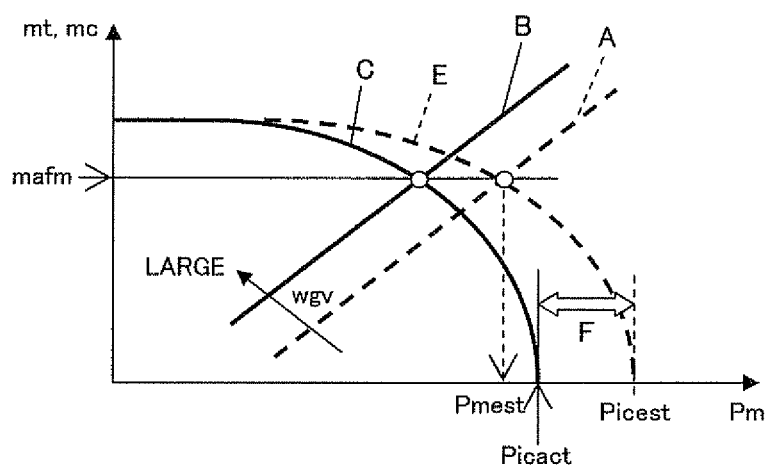
FIG. 5 is a diagram for explaining a method of determination of a deviation between an estimated value and an actual value of a waste gate valve opening, which is adopted in embodiment 2 of the present invention.

The axis of abscissa of a graph shown in FIG. 5 represents the intake manifold pressure (Pm), and the axis of ordinates represents the throttle flow rate (mt) and the intake valve flow rate (mc). The straight line A shown in the graph is a straight line showing a relation of the intake manifold pressure (Pm) and the intake valve flow rate (mc) which are obtained by inputting the estimated value of the waste gate valve opening in the intake valve model M6. The estimated value (Pmest) of the intake manifold pressure is calculated by substituting the measured value (mafm) of the intake flow rate into the equation which expresses the straight line A. Since in a steady state, the intake valve flow rate and the intake flow rate correspond to each other, the measured value of the intake flow rate can be dealt as the actual value of the intake valve flow rate in the intake valve model M6.

Next, the estimated value (Pmest) of the intake manifold pressure which is calculated from the intake valve model M6 is inputted in the throttle model M4 with the respective measured values of the throttle opening and the intake flow rate. Since in a steady state, the intake valve flow rate and the throttle flow rate correspond to each other, the measured value of the intake flow rate can be dealt as the actual value of the throttle flow rate in the throttle model M4. A curve E shown in the graph is a curve which shows a relation of the intake manifold pressure (Pm) and the throttle flow rate (mt) which are specified by inputting the information of them into the throttle model M4. When the throttle flow rate (mt) becomes zero in the curve E, the intake manifold pressure (Pm) becomes equal to the supercharging pressure. By calculating the value of the supercharging pressure by using the equation of the curve E, an estimated supercharging pressure (Picest) can be obtained under the estimated value of the waste gate valve opening.

In the present embodiment, the estimated value (Picest) of the supercharging pressure which is obtained like this and the supercharging pressure (Picact) which is measured by the supercharging pressure sensor 44 are compared. When an error is present between the estimated value (Picest) and the measured value (Picact) of the supercharging pressure, the error means that a deviation occurs between the indicated value and the actual value of the waste gate valve opening. This is because according to the throttle model M4 and the intake valve model M6, the estimated value (Pmest) of the intake manifold pressure is determined in accordance with the estimated value of the waste gate valve opening, and the estimated value (Picest) of the supercharging pressure is determined by the estimated value (Pmest) of the intake manifold pressure. From this, when an error (shown by F in the graph) is present between the estimated value (Picest) and the measured value (Picact) of the supercharging pressure, it can be determined that a deviation occurs between the estimated value and the actual value of the waste gate valve opening with the presence of the error.

The straight line B shown in the graph is a straight line showing a relation of the intake manifold pressure (Pm) and the intake valve flow rate (mc) which should be obtained if the actual value of the waste gate valve opening is inputted in the intake valve model M6. However, since the actual value of the waste gate valve opening cannot be directly measured, the straight line B cannot be actually specified. The curve C is a curve which shows a relation of the intake manifold pressure (Pm) and the throttle flow rate (mt) which are obtained by inputting the respective measured values of the throttle opening and the supercharging pressure in the throttle model M4. The value of the intake manifold pressure (Pm) at the time of the throttle flow rate (mt) becoming zero in the curve C corresponds to the measured value (Picact) of the supercharging pressure.

Next, a method for correction of the estimated value of the waste gate valve opening, which is adopted in the present embodiment, will be described. In the present embodiment, a correspondence relation of the waste gate valve opening and the manipulated variable is regulated by correcting data of a map which links the waste gate valve opening with the manipulated variable of the waste gate valve 38, as in the case of embodiment 1. In the regulation, if the estimated value (Picest) of the supercharging pressure is larger than the measured value (Picact) as shown in the graph, the waste gate valve opening is corrected to a plus side with respect to the manipulated variable. Conversely, if the estimated value (Picest) of the supercharging pressure is smaller than the measured value (Picact), the waste gate valve opening is corrected to a minus side with respect to the manipulated variable.

Figure 6:
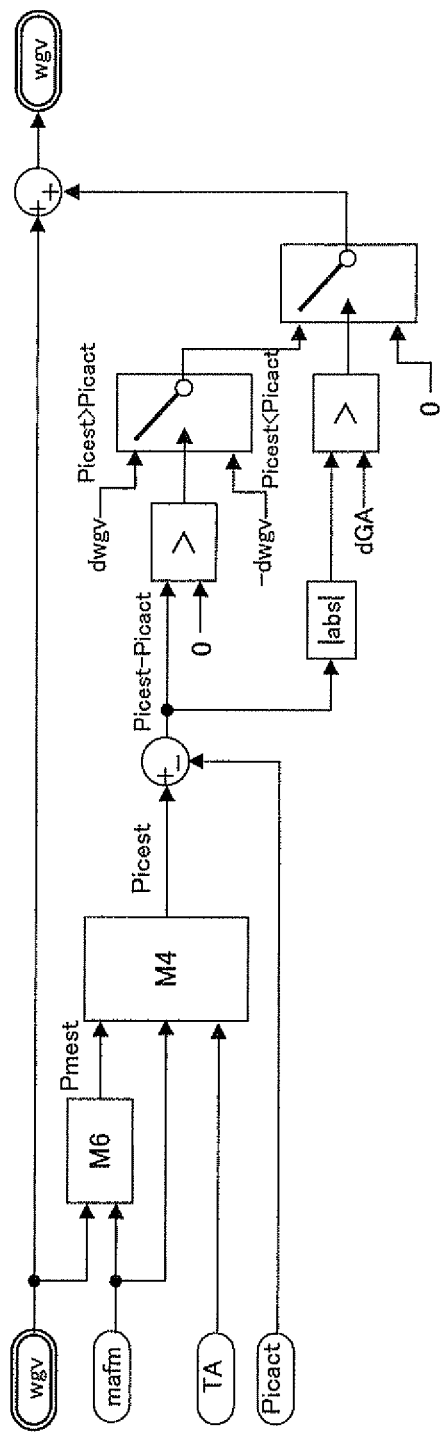
FIG. 6 is a block diagram showing a function for correcting the estimated value of the waste gate valve opening which a control device of embodiment 2 of the present invention has.

FIG. 6 shows a configuration for realizing such a method for correction by the ECU 40. As shown in the block diagram, the ECU 40 uses the intake valve model M6 and the throttle model M4. In the ECU 40, the waste gate valve opening (wgv) which is estimated from the manipulation variable is taken, and the supercharging pressure (Picact) which is measured by the supercharging pressure sensor 44, the throttle opening (TA) which is measured by the throttle opening sensor 46, and the intake flow rate (mafm) which is measured by the air flow meter 42 are also taken.

The waste gate valve opening (wgv) which is taken in is inputted in the intake valve model M6 together with the intake flow rate (mafm). In the intake valve model M6, the estimated value (Pmest) of the intake manifold pressure is calculated based on the waste gate valve opening (wgv) and the intake flow rate (mafm). The estimated value (Pmest) of the intake manifold pressure which is calculated in the intake valve model M6 is inputted in the throttle model M4 together with the intake flow rate (mafm) and the throttle opening (TA). In the throttle model M4, the estimated value (Picest) of the supercharging pressure is calculated based on the input information of them.

Next, the ECU 40 calculates the difference between the estimated value (Picest) and the measured value (Picact) of the supercharging pressure. Subsequently, it is determined whether the difference value (Picest−Picact) is larger than zero. When the difference value is larger than zero, that is, when the estimated value (Picest) of the supercharging pressure is larger than the measured value (Picact), a predetermined value (dwgv) which is larger than zero is set as the correction amount of the waste gate valve opening (wgv). Meanwhile, when the difference value is smaller than zero, that is, when the estimated value (Picest) of the supercharging pressure is smaller than the measured value (Picact), a predetermined value (−dwgv) which is smaller than zero is set as the correction amount of the waste gate valve opening (wgv). These correction amounts are added to the waste gate valve opening (wgv) when the absolute value of the difference value is larger than a predetermined value (dGA). When the absolute value of the difference value is the predetermined value (dGA) or less, the correction amount is set as zero irrespective of presence or absence of the difference.

Embodiment 3

Next, embodiment 3 of the present invention will be described with reference to the drawings.

A control device of the present embodiment is applied to a supercharged engine which is configured as in FIG. 1 as in embodiments 1 and 2. However, in the present embodiment, a variable valve mechanism not illustrated is provided at an intake valve. The variable valve mechanism is a device which makes valve timing and a valve lift amount of the intake valve variable. The control device of the present embodiment is realized as part of the function of the ECU 40 which controls such a supercharged engine.

The ECU 40 as the control device has the function of estimating an air quantity in a cylinder by using the air quantity estimation model shown in FIG. 2, as in embodiments 1 and 2. However, in the present embodiment, the valve timing and the valve lift amount are added as parameters in the intake valve model M6. More specifically, in an equation of a straight line which approximates a relation of the intake air quantity and the intake manifold pressure, the valve timing and the valve lift amount are referred to in addition to the waste gate valve opening, in determination of the coefficients thereof. The correspondence relation of these parameters and the respective coefficients are determined by performing a test. The valve timing which is used in the intake valve model M6 is a measured value, whereas an estimated value is used as the valve lift amount. This is because the valve lift amount is difficult to measure directly similarly to the waste gate valve opening. The ECU 40 stores a map showing a correspondence relation of the manipulated variable of the variable valve mechanism and the valve lift amount. The estimated value of the valve lift amount corresponding to the manipulated variable of the variable valve mechanism is acquired by referring to the map.

Further, the ECU 40 as the control device has the function of regulating the correspondence relation of the waste gate valve opening and the manipulated variable of the waste gate valve which is defined in the map. In the function thereof, two methods can be adopted as the regulating method. One of the regulating methods has commonality with the regulating method which is adopted in embodiment 1. However, as the feature of the present embodiment, the measured value of the valve timing and the estimated value of the valve lift amount are used in the calculation using the intake valve model M6. The other regulating method is the regulating method peculiar to the present embodiment. Hereinafter, the regulating method common to embodiment 1 will be called a first regulating method, and the regulating method peculiar to the present embodiment will be called a second regulating method.

First, a method for determining a deviation between the estimated value and the actual value of the waste gate valve opening according to the second regulating method will be described with use of FIGS. 7 and 8. Here, it is assumed that the estimated value of the waste gate valve opening is estimated as smaller than the actual value.

Figure 7:
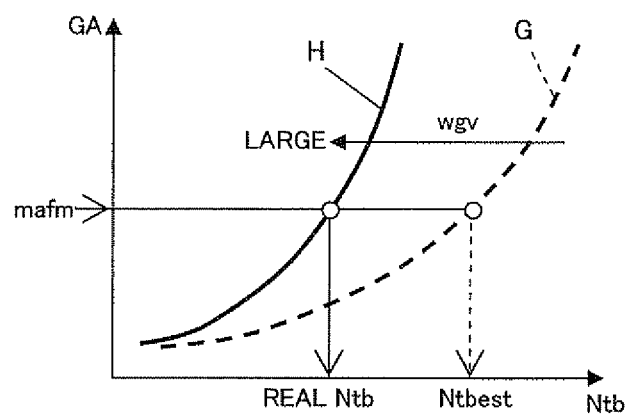
FIG. 7 is a diagram for explaining a method of determination of a deviation between an estimated value and an actual value of a waste gate valve opening, which is adopted in embodiment 3 of the present invention.

The axis of abscissa of a graph shown in FIG. 7 represents a turbo rotational speed (Ntb), and the axis of ordinates represents the intake flow rate (GA). The curve G shown in the graph is a curve showing a relation of the turbo rotational speed (Ntb) which is obtained by inputting the estimated value of the waste gate valve opening in the turbo rotational speed model M1 and the intake flow rate (GA). By substituting the measured value (mafm) of the intake flow rate into the equation expressing the curve G, the estimated value (Ntbest) of the turbo rotational speed is calculated. Since the intake valve flow rate and the intake flow rate correspond to each other in a steady state, the measured value of the intake flow rate can be dealt as the actual value of the intake valve flow rate in the turbo rotational speed model M1. Meanwhile, a curve H is a curve which shows a relation of the turbo rotational speed (Ntb) which should be obtained if the actual value of the waste gate valve opening is inputted in the turbo rotational speed model M1 and the intake flow rate (GA). The turbo rotational speed which is specified by the curve H and the measured value (mafm) of the intake flow rate is a real turbo rotational speed. However, since the actual value of the waste gate valve opening cannot be directly measured, the curve H shown in the graph is only virtual, and only the curve G can be derived in reality.

Next, the estimated value (Ntbest) of the turbo rotational speed which is calculated from the turbo rotational speed model M1 is inputted in the compressor model M2 with the respective measured values of the supercharging pressure and the atmospheric pressure. The axis of abscissa of the graph shown in FIG. 8 represents a ratio of the supercharging pressure (Pic) and the atmospheric pressure (Pa), and the axis of ordinates represents a compressor flow rate (mcp). A curve J shown in the graph is a curve showing a relation of a pressure ratio (Pic/Pa) and a compressor flow rate (mcp) which are obtained by inputting the estimated value (Ntbest) of the turbo rotational speed in the compressor model M2. By substituting a ratio of the measured value (Picact) of the supercharging pressure and the measured value (Paact) of the atmospheric pressure into an equation expressing the curve J, the estimated compressor flow rate (mcpest) can be obtained under the estimated value of the waste gate valve opening.

Subsequently, the estimated value (mcpest) of the compressor flow rate which is obtained from the compressor model M2, and the measured value (mafm) of the intake flow rate by the air flow meter 42 are compared. Since the compressor flow rate and the intake flow rate correspond to each other in a steady state, comparing the estimated value (mcpest) of the compressor flow rate and the measured value (mafm) of the intake flow rate is equivalent to comparing the estimated value (mcpest) of the compressor flow rate and the actual value of it. When an error is present between the estimated value (mcpest) of the compressor flow rate and the actual value of it, the error means that a deviation occurs between the indicated value and the actual value of the waste gate valve opening. This is because according to the turbo rotational speed model M1 and the compressor model M2, the estimated value (Ntbest) of the turbo rotational speed is determined in correspondence with the estimated value of the waste gate valve opening, and the estimated value (mcpest) of the compressor flow rate is determined by the estimated value (Ntbest) of the turbo rotational speed. From this, if an error (shown by L in the graph) is present between the estimated value (mcpest) of the compressor flow rate and the measured value (mafm) of the intake flow rate, it can be determined that a deviation occurs between the estimated value and the actual value of the waste gate valve opening with the presence of the error.

Figure 8:
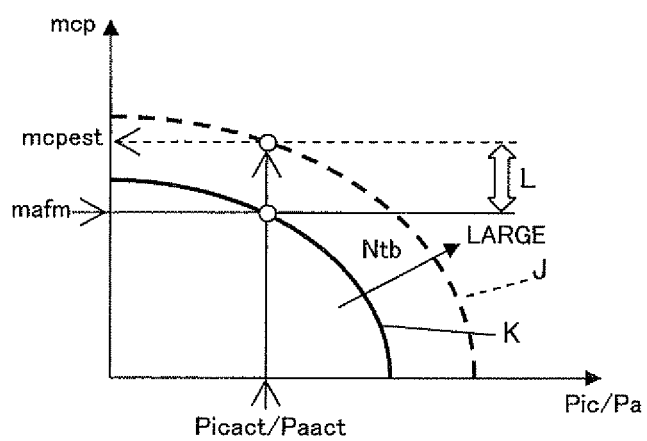
FIG. 8 is a diagram for explaining a method of determination of the deviation between the estimated value and the actual value of the waste gate valve opening, which is adopted in embodiment 3 of the present invention.

A curve K shown in the graph in FIG. 8 is a curve showing a relation of the pressure ratio (Pic/Pa) and the compressor flow rate (mcp) which should be obtained if the actual value of the turbo rotational speed is inputted in the compressor model M2. The coordinates which are fixed by the measured value (Picact/Paact) of the pressure ratio and the measured value (mafm) of the intake flow rate are located on the curve K. However, since the supercharged engine according to the present embodiment does not have means which actually measures the actual value of the turbo rotational speed, the curve K cannot be actually specified.

Next, a method for correcting the estimated value of the waste gate valve opening according to the second regulating method will be described. According to the second regulating method, regulation of a correspondence relation of the waste gate valve opening and the manipulated variable is performed by correcting the data of the map which links the waste gate valve opening with the manipulated variable of the waste gate valve 38, as in the case according to the first regulating method. In the regulation, if the estimated value (mcpest) of the compressor flow rate is larger than the measured value (mafm) of the intake flow rate as shown in the graph of FIG. 8, the waste gate valve opening is corrected to a plus side with respect to the manipulated variable so as to decrease the estimated value (Ntbest) of the turbo rotational speed which is calculated in the turbo rotational speed model M1. Conversely, if the estimated value (mcpest) of the compressor flow rate is smaller than the measured value (mafm) of the intake flow rate, the waste gate valve opening is corrected to a minus side with respect to the manipulated variable so as to increase the estimated value (Ntbest) of the turbo rotational speed which is calculated in the turbo rotational speed model M1.

Figure 9:
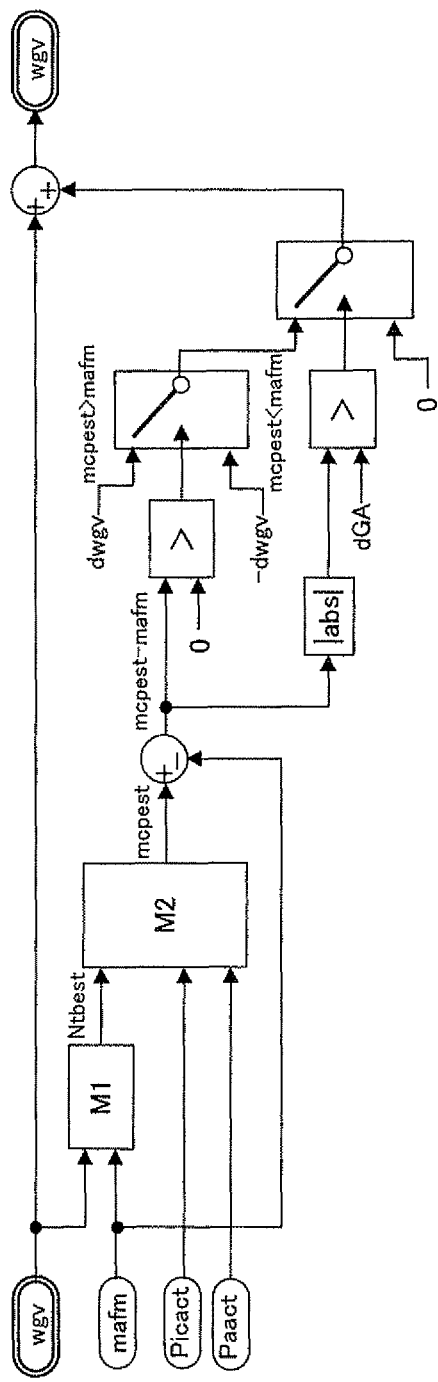
FIG. 9 is a block diagram showing a function for correcting the estimated value of the waste gate valve opening which the control device of embodiment 3 of the present invention has.

FIG. 9 shows a configuration for realizing the method for correction like this by the ECU 40. As shown in the block diagram, the ECU 40 uses the turbo rotational speed model M1 and the compressor model M2. Further, in the ECU 40, the waste gate valve opening (wgv) which is estimated from the manipulated variable is taken, and the intake flow rate (mafm) which is measured by the air flow meter 42, the supercharging pressure (Picact) which is measured by the supercharging pressure sensor 44, and the atmospheric pressure (Paact) which is measured by the atmospheric pressure sensor 48 are also taken.

The waste gate valve opening (wgv) which is taken in is inputted in the turbo rotational speed model M1 together with the intake flow rate (mafm). In the turbo rotational speed model M1, the estimated value (Ntbest) of the turbo rotational speed is calculated based on the waste gate valve opening (wgv) and the intake flow rate (mafm). The estimated value (Ntbest) of the turbo rotational speed which is calculated in the turbo rotational speed model M1 is inputted in the compressor model M2 together with the supercharging pressure (Picact) and the atmospheric pressure (Paact). In the compressor model M2, the estimated value (mcpest) of the compressor flow rate is calculated based on the input information of them.

Next, the ECU 40 calculates a difference between the estimated value (mcpest) of the compressor flow rate and the intake flow rate (mafm). Subsequently, it is determined whether the difference value (mcpest−mafm) is larger than zero. When the difference value is larger than zero, that is, when the estimated value (mcpest) of the compressor flow rate is larger than the intake flow rate (mafm), a predetermined value (dwgv) which is larger than zero is set as the correction amount of the waste gate valve opening (wgv). Meanwhile, when the difference value is smaller than zero, that is, when the estimated value (mcpest) of the compressor flow rate is smaller than the intake flow rate (mafm), a predetermined value (−dwgv) which is smaller than zero is set as the correction amount of the waste gate valve opening (wgv). These correction amounts are added to the waste gate valve opening (wgv) when the absolute value of the difference value is larger than a predetermined value (dGA). When the absolute value of the difference value is the predetermined value (dGA) or less, the correction amount is set as zero irrespective of presence or absence of the difference.

The regulation result of the correspondence relation of the waste gate valve opening and the manipulated variable of the waste gate valve 38 which is obtained according to the method described above is the regulation result according to the second regulating method. The regulation result (hereinafter, the second regulation result) according to the second regulating method does not necessarily correspond to the regulation result (hereinafter, the first regulation result) according to the first regulating method which is the similar method to that of embodiment 1. This is because the first regulation result is influenced by the estimated value of the valve lift amount, whereas the second regulation result is not influenced by the estimated value of the valve lift amount. As the waste gate valve opening, a deviation sometimes occurs between the estimated value and the actual value of the valve lift amount. In this case, the first regulation result which uses the intake valve model M6 includes the error corresponding to it. In other words, when a deviation is present between two regulation results, the deviation means that a deviation occurs between the estimated value and the actual value of the valve lift amount.

Figure 10:
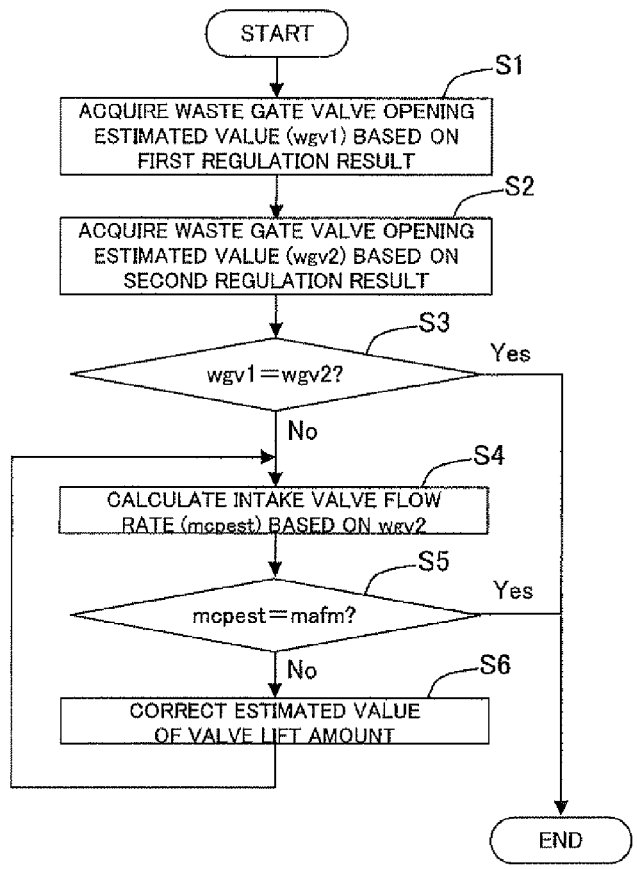
FIG. 10 is a flowchart showing processing for correction of an estimated value of a valve lift amount which is performed in embodiment 3 of the present invention.
Figure 11:
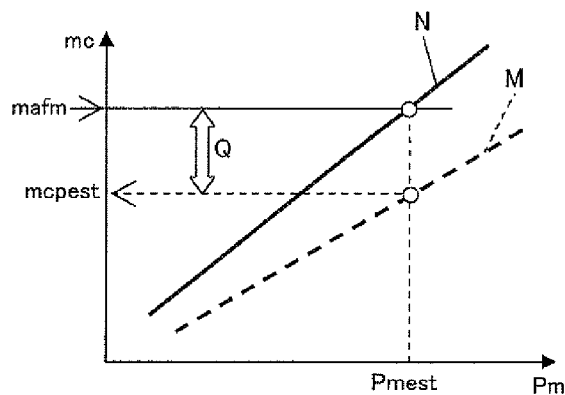
FIG. 11 is a diagram for explaining a method of determination of a deviation between the estimated value and an actual value of the valve lift amount, which is adopted in embodiment 3 of the present invention.

When the first regulation result and the second regulation result do not correspond to each other, the ECU 40 according to the present embodiment corrects the estimated value of the valve lift amount in accordance with the actual value with the second regulation result as the reference. FIG. 10 is a flowchart showing processing for correction of the estimated value of the valve lift amount which is performed by the ECU 40. FIG. 11 is a diagram for explaining a method for determination of a deviation between the estimated value and the actual value of the valve lift amount, which is adopted in the present embodiment. Hereinafter, a method for correcting the estimated value of the valve lift amount in accordance with the actual value will be described with use of these drawings.

In step S1 shown in the flowchart of FIG. 10, an estimated value (wgv1) of the waste gate valve opening is acquired by using a map in which the first regulation result is reflected. In step S2, an estimated value (wgv2) of the waste gate valve opening is acquired by using a map in which a second regulation result is reflected. Subsequently, in step S3, it is determined whether the two estimated values (wgv1, wgv2) of the waste gate valve opening correspond to each other. If the two estimated values (wgv1, wgv2) correspond to each other, it can be determined that the estimated value of the valve lift amount corresponds to the actual value.

Meanwhile, when the two estimated values (wgv1, wgv2) do not correspond to each other, it can be determined that the estimated value of the valve lift amount does not correspond to the actual value. In this case, processing from step S4 through S6 is repeatedly performed. In step S4, an equation of a straight line which expresses the intake valve model M6 is determined based on the estimated value (wgv2) of the waste gate valve opening according to the second regulation result and the estimated value of the present valve lift amount. The straight line is shown as a straight line M in the graph of FIG. 11. By substituting the estimated value (Pmest) of the intake manifold pressure at the present time point into the equation of the straight line M, the estimated value (mcest) of the intake valve flow rate corresponding to the estimated value of the present valve lift amount is calculated. A straight line N is a straight line showing a relation of the intake manifold pressure (Pm) and the intake valve flow rate (mc) which should be obtained if the actual value of the valve lift amount is inputted in the intake valve model M6. However, since the actual value of the valve lift amount cannot be directly measured, the straight line N shown in the graph is only virtual, and only the straight line M can be derived in reality.

In the next step S5, the estimated value (mcest) of the intake valve flow rate and the intake flow rate (mafm) which is measured by the air flow meter 42 are compared. When an error (shown by Q in the graph) is present between the estimated value (mcest) of the intake valve flow rate and the measured value (mafm) of the intake flow rate as shown in FIG. 11, it can be determined that an error is present between the estimated value and the actual value of the valve lift amount. In the present embodiment, the valve timing is also referred to as the parameter of the intake valve model M6, but the influence which the valve timing gives to the estimation precision of the waste gate valve opening is considered to be small as compared with the valve lift amount. This is because with respect to the valve timing, the measured value is used, and even if a measurement error is present, such an error is smaller than the error which can be included in the estimated value of the valve lift amount. However, if the influence of the measurement error of the valve timing is desired to be excluded, regulation of the estimated value of the waste gate valve opening can be performed only when the valve timing is fixed to the most advanced position or the most retarded position. Further, the amount of deposit which adheres to the intake value also influences the relation of the intake manifold pressure and the intake valve flow rate, but this can be considered to be included in the valve lift amount. More specifically, the valve lift amount in the present embodiment means the real valve lift amount including deposit.

When an error is present between the estimated value (mcest) of the intake valve flow rate and the measured value (mafm) of the intake flow rate, the data of the map in which the valve lift amount is correlated with the manipulated variable of the variable valve mechanism is corrected in the next step S6. For example, as shown in FIG. 11, when the estimated value (mcest) of the intake valve flow rate is smaller than the measured value (mafm) of the intake flow rate, the valve lift amount is corrected to a plus side with respect to the manipulated variable of the variable valve mechanism so that the intake valve flow rate which is calculated in the intake valve model M6 increases. Conversely, when the estimated value (mcest) of the intake valve flow rate is larger than the measured value (mafm) of the intake flow rate, the valve lift amount is corrected to a minus side with respect to the manipulated variable of the variable valve mechanism so that the intake valve flow rate which is calculated in the intake valve model M6 decreases. In this manner, regulation of the correspondence relation of the valve lift amount and the manipulated variable of the variable valve mechanism is performed.

After the processing of step S6, the flow returns to step S4 again, and the estimated value of the valve lift amount is recalculated in accordance with the regulated correspondence relation. Subsequently, the estimated value (mcest) of the intake valve flow rate is recalculated by using the intake valve model M6 based on the estimated value (wgv2) of the waste gate valve opening and the estimated value of the valve lift amount which is recalculated. Subsequently, the estimated value (mcest) of the intake valve flow rate which is recalculated in step S5 and the measured value (mafm) of the intake flow rate are compared. Such a series of processing is repeatedly carried out until the determination result of step S5 becomes affirmative. Thereby, a deviation of the estimated value of the valve lift amount with respect to the actual value is eliminated.

Others

The present invention is not limited to the aforementioned embodiments, and can be carried out by being variously modified within the range without departing from the gist of the present invention. For example, as the method for regulating the correspondence relation of the waste gate valve opening and the manipulated variable of the waste gate valve, the data of the map which defines the correspondence relation is not corrected, but a correction amount for regulation may be added to the estimated value of the waste gate valve opening which is obtained from the map.

In embodiment 3, the regulating method which is adopted in embodiment 1 is adopted as the first regulating method, but the regulating method which is adopted in embodiment 2 may be adopted as the first regulating method. In the regulating method of embodiment 2, the intake valve model M6 is also used, and therefore, the regulation result includes the error corresponding to the deviation amount between the estimated value and the actual value of the valve lift amount. Accordingly, by comparing the regulation result thereof and the regulation result according to the second regulating method, it can be determined whether a deviation occurs between the estimated value and the actual value of the valve lift amount.

The supercharged engines according to embodiments 1 and 2 each may have a variable valve mechanism which makes valve timing variable. In this case, in the intake valve model, the coefficient of the equation of a straight line is determined based on the waste gate valve opening and the valve timing. The influence of the measurement error of the valve timing is as described above, and if it is desired to be excluded, regulation of the estimated value of the waste gate valve opening can be performed only when the valve timing is fixed to the most advanced position or the most retarded position.

Further, the supercharged engines according to embodiments 1 and 2 each may have a variable valve mechanism which makes a valve lift amount variable. In this case, the regulation result of the estimated value of the waste gate valve opening is likely to include an error corresponding to a deviation amount between the estimated value and the actual value of the valve lift amount. However, the estimation error of the waste gate valve opening is larger than that of the valve lift amount, and the influence which the estimation error of the waste gate valve opening gives to the estimation precision of the air quantity in a cylinder is large. Therefore, even if the estimation error of the valve lift amount has an influence to some degree, the advantage which is obtained by carrying out the present invention is not sharply impaired by this. If the influence of the estimation error of the valve lift amount is desired to be excluded, regulation of the estimated value of the waste gate valve opening is performed only within the confines of the case in which the valve lift amount is fixed to the maximum or minimum.

In the supercharged engine to which the control device of the present invention is applied, an intercooler and an air bypass valve are not essential. Conversely, an EGR device may be provided in the supercharged engine to which the control device of the present invention is applied. In this case, in accordance with the equipment which is omitted and the equipment which is added, the configuration of the air quantity estimation model shown in FIG. 2 can be changed. For example, in the supercharged engine which does not have an air bypass valve, the ABV model may be omitted from the air quantity estimation model. Further, in the supercharged engine which has an EGR device, the EGR model may be added to the air quantity estimation model.

DESCRIPTION OF REFERENCE NUMERALS

M1 Turbo rotational speed model
M2 Compressor model
M3 Intercooler model
M4 Throttle model
M5 Intake manifold model
M6 Intake valve model
M7 ABV model Description of Models 1. Turbo Rotational Speed Model M1

The turbo rotational speed model can be defined by the following equation:

$$Ntb = ftb(wgv, mc)$$

In the equation, Ntb is a turbo rotational speed; wgv is a waste gate valve opening; mc is an intake valve flow rate; and ftb is a function expressing the empirical relationship between Ntb, wgv and mc.

2. Compressor Model M2

The compressor model can be defined by the following equation:

$$mcp = fcp(Ntb, Pic)$$

In the equation, mcp is a compressor flow rate; Ntb is a turbo rotational speed; Pic is a supercharging pressure; and fcp is a function expressing the empirical relationship between mcp, Ntb and Pic.

3. Intercooler Model M3

The intercooler model can be defined by the following energy conservation rule formula and the following flow rate conservation rule formula:

<Energy Conservation Rule Formula>

$$dPic/dt = k*R/Vic*(mcp*Ta - mabv*Tic - mt*Tic)$$

<Flow Rate Conservation Rule Formula>

$$d/dt(Pic/Tic) = R/Vic*(mcp - mabv - mt)$$

In the formulas, Pic is a supercharging pressure; Tic is an intercooler temperature; Vic is an intercooler volume; R is a gas constant; κ is a specific heat ratio; mcp is a compressor flow rate; mabv is an air bypass valve flow rate; mt is a throttle flow rate; and Ta is an atmospheric temperature.

4. Throttle Model M4

The throttle model can be defined by the following flow rate formula of an orifice:

$$mt = \mu*A(TA)*Pic/\sqrt{R*Tic}*\phi(Pm/Pic)$$

$$\Phi\left(\frac{Pm}{Pic}\right) = \left\{ \begin{array}{ll} \sqrt{\dfrac{k}{2*(k+1)}} & \dfrac{Pm}{Pic} \leq \dfrac{1}{k+1} \\ \sqrt{\left\{\dfrac{k-1}{2}*\left(1-\dfrac{Pm}{Pic}\right) + \dfrac{Pm}{Pic}\right\}*\left(1-\dfrac{Pm}{Pic}\right)} & \dfrac{Pm}{Pic} > \dfrac{1}{k+1} \end{array} \right\}$$

In the formula, μ is a flow rate coefficient; A(TA) is an opening area when a throttle opening is TA; Pic is a supercharging pressure; Tic is an intercooler temperature; R is a gas constant; Pm is an intake manifold pressure and κ is a specific heat ratio. Pm/Pic is a ratio of throttle downstream pressure and throttle upstream pressure.

5. Intake Manifold Model M5

The intake manifold model can be defined by the following energy conservation rule formula and the following flow rate conservation rule formula:

<Energy Conservation Rule Formula>

$$dPm/dt = k*R/Vm*(mt*Tic - mc*Tm)$$

<Flow Rate Conservation Rule Formula>

$$d/dt(Pm/Tm) = R/Vm*(mt - mc)$$

In the formulas, Pm is an intake manifold pressure; Tic is an intercooler temperature; Vm is an intake manifold volume; R is a gas constant; κ is a specific heat ratio; mc is an intake valve flow rate; mt is a throttle flow rate; and Tm is an intake pipe temperature.

6. Intake Valve Model M6

The intake valve model can be defined by the following linear equation:

$$mc = Ta/Tm(a*Pm - b)$$

In the equation, mc is an intake valve flow rate; Pm is an intake manifold pressure; Tm is an intake pipe temperature; and Ta is an atmospheric temperature; and "a" and "b" are coefficients which are variables determined by a waste gate valve opening.

7. ABV Model M7

The ABV model can be defined by the following equation:

$$mabv = fabv(Pa, Pic, Dabv)$$

In the equation, mabv is an air bypass valve flow rate; Pic is a supercharging pressure; Pa is an atmospheric pressure; Dabv is a duty ratio of an air bypass valve; and fabv is a function expressing the hydrodynamic relationship between mabv, Pa, Pic and Dabv. A flow rate formula of an orifice can be used as the ABV model.

The invention claimed is:

1. A control device for a supercharged engine having a waste gate valve, comprising:
    a throttle opening sensor configured to measure a value of a throttle opening;
    a pressure sensor configured to measure a value of a throttle upstream pressure;
    an air flow meter configured to measure a value of an intake flow rate;
    an electronic control unit configured to:
        estimate a value of a waste gate valve opening corresponding to a manipulated variable of the waste gate valve in accordance with a first predefined correspondence relation;
        obtain a first relation which is established between a throttle downstream pressure and an intake valve flow rate based on the estimated value of the waste gate valve opening by using an intake valve model in which a relation that is established between the throttle downstream pressure, the waste gate valve opening, and the intake valve flow rate is modeled;
        obtain a second relation which is established between the throttle downstream pressure and a throttle flow rate based on a measured value of the throttle opening and a measured value of the throttle upstream pressure by using a throttle model in which a relation that is established between the throttle upstream pressure, the throttle downstream pressure, the throttle opening, and the throttle flow rate is modeled;
        estimate a value of the intake valve flow rate in a case in which the intake valve flow rate corresponds to the throttle flow rate based on the first relation and the second relation;
        correct the first predefined correspondence relation based on a first comparison between the estimated value of the intake valve flow rate and a measured value of the intake flow rate; and
        operate the waste gate valve to control a turbo rotational speed or regulate a supercharging pressure.

2. The control device for a supercharged engine according to claim 1, wherein:
    the supercharged engine is an engine including a variable valve lift mechanism that makes a valve lift amount of an intake valve variable; and
    the electronic control unit is configured to:
        use the valve lift amount as a parameter of the intake valve model;
        estimate a value of the valve lift amount corresponding to a manipulated variable of the variable valve lift mechanism in accordance with a second predefined correspondence relation;
        estimate a value of a turbo rotational speed based on the estimated value of the waste gate valve opening and the measured value of the intake flow rate by using a turbo rotational speed model in which a relation that is established between the intake valve flow rate, the waste gate valve opening, and the turbo rotational speed is modeled;
        estimate a value of a compressor flow rate based on the estimated value of the turbo rotational speed and the measured value of the throttle upstream pressure by using a compressor model in which a relation that is established between the turbo rotational speed, the throttle upstream pressure, and the compressor flow rate is modeled;
        correct the first predefined correspondence relation based on a second comparison between the estimated value of the compressor flow rate and the measured value of the intake flow rate;
        recalculate the estimated value of the waste gate valve opening in accordance with the first predefined correspondence relation that is corrected based on the second comparison when a correction based on the second comparison differs from a correction based on the first comparison;
        recalculate the estimated value of the intake valve flow rate based on the estimated value of the waste gate valve opening and the estimated value of the valve lift amount by using the intake valve model; and
        correct the second predefined correspondence relation based on a first comparison between the estimated value of the intake valve flow rate and the measured value of the intake flow rate.

3. A control device for a supercharged engine having a waste gate valve, comprising:
    a throttle opening sensor configured to measure a value of a throttle opening;
    a pressure sensor configured to measure a value of a throttle upstream pressure;
    an air flow meter configured to measure a value of an intake flow rate;
    an electronic control unit configured to:
        estimate a value of a waste gate valve opening corresponding to a manipulated variable of the waste gate valve in accordance with a first predefined correspondence relation;
        estimate value of a throttle downstream pressure based on the estimated value of the waste gate valve opening and a measured value of the intake flow rate by using an intake valve model in which a relation that is established between the throttle downstream pressure, the waste gate valve opening, and the intake valve flow rate is modeled;
        estimate a value of the throttle upstream pressure based on the estimated value of the throttle downstream pressure, a measured value of the throttle opening, and a measured value of the intake flow rate by using a throttle model in which a relation that is established between the throttle upstream pressure, the throttle downstream pressure, the throttle opening, and the throttle flow rate is modeled;

correct the first predefined correspondence relation based on a first comparison between the estimated value and a measured value of the throttle upstream pressure; and operate the waste gate valve to control a turbo rotational speed or regulate a supercharging pressure.

4. The control device for a supercharged engine according to claim 3, wherein:

the supercharged engine is an engine including a variable valve lift mechanism that makes a valve lift amount of an intake valve variable; and the electronic control unit is configured to:

use the valve lift amount as a parameter of the intake valve model;

estimate a value of the valve lift amount corresponding to a manipulated variable of the variable valve lift mechanism in accordance with a second predefined correspondence relation;

estimate a value of a turbo rotational speed based on the estimated value of the waste gate valve opening and the measured value of the intake flow rate by using a turbo rotational speed model in which a relation that is established between the intake valve flow rate, the waste gate valve opening, and the turbo rotational speed is modeled;

estimate a value of a compressor flow rate based on the estimated value of the turbo rotational speed and the measured value of the throttle upstream pressure by using a compressor model in which a relation that is established between the turbo rotational speed, the throttle upstream pressure, and the compressor flow rate is modeled;

correct the first predefined correspondence relation based on a second comparison between the estimated value of the compressor flow rate and the measured value of the intake flow rate;

recalculate the estimated value of the waste gate valve opening in accordance with the first predefined correspondence relation that is corrected based on the second comparison when a correction based on the second comparison differs from a correction based on the first comparison;

estimate a value of the intake valve flow rate based on the estimated value of the waste gate valve opening and the estimated value of the valve lift amount by using the intake valve model; and correct the second predefined correspondence relation based on a first comparison between the estimated value of the intake valve flow rate and the measured value of the intake flow rate.

* * * * *